Patented June 3, 1947

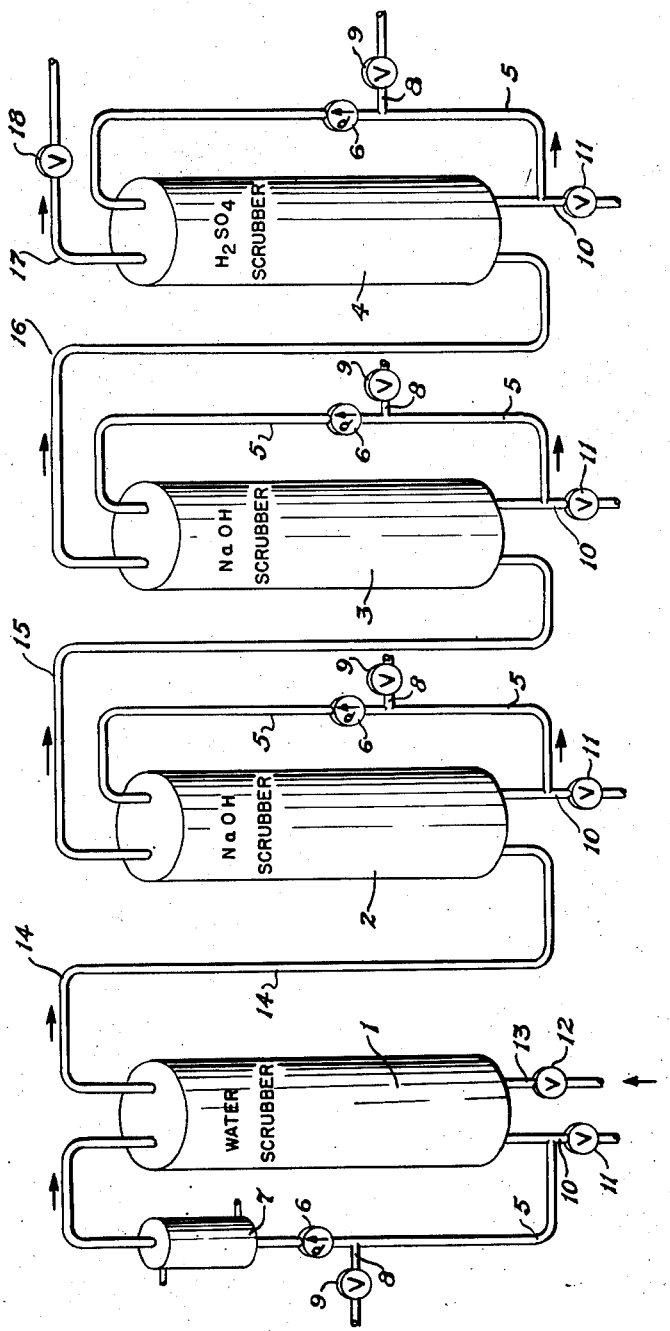

2,421,441

UNITED STATES PATENT OFFICE 2,421,441

PURIFICATION OF METHYL CHLORIDE

Edgar Allen Thronson, Lewiston, and Arthur Ignatius Mendolia, Niagara Falls, N. Y., assignors to E. I. du Pont de Nemours & Company, Wilmington, Del., a corporation of Delaware Application November 15, 1944, Serial No. 563,550

1 Claim. (Cl. 260—652)

This invention relates to a new and improved process for the purification of methyl chloride, and more particularly it relates to the production of methyl chloride containing exceedingly small amounts of methanol and dimethyl ether.

Methyl chloride is produced by reacting methanol with hydrochloric acid in the presence of a catalyst, for example, zinc chloride. A crude gaseous product is obtained in this manner containing beside methyl chloride, unreacted hydrochloric acid, unreacted methanol, water and dimethyl ether. Heretofore, this crude methyl chloride has been purified and dried by passing the same, in succession, counter-currently to water, concentrated sodium hydroxide solution, and concentrated sulfuric acid.

Methyl chloride produced in the above-said manner contains varying proportions of methanol and dimethyl ether. Frequently, the quantities of methanol and dimethyl ether in the methyl chloride were of such proportions as to be highly objectionable for commercial sale and utility in certain critical processes. For years the presence of varying proportions of methanol and dimethyl ether in methyl chloride was exceedingly troublesome. The reason for the occasional presence of relatively large proportions of the above-said impurities in methyl chloride was not apparent.

It is an object of the present invention to provide an improved method for the removal of methanol and dimethyl ether from methyl chloride.

It is another object of this invention to inhibit the formation of methanol during the purification of methyl chloride.

It is another object of this invention to provide a process for the production of methyl chloride containing exceedingly small amounts of methanol and dimethyl ether.

Other objects of the invention will appear hereinafter.

The above objects may, in general, be accomplished by scrubbing methyl chloride that contains an undesirably high proportion of impurities with water having a temperature not to exceed 40° C., then scrubbing the methyl chloride at a temperature not to exceed 25° C., with an aqueous solution of sodium hydroxide the concentration of which does not exceed 10% (by weight), and subsequently scrubbing the methyl chloride with concentrated sulfuric acid.

The scrubbing of the methyl chloride with the above mentioned scrubbing liquids may be carried out most conveniently by passing the methyl chloride gas counter-currently to the scrubbing liquids in a series of packed scrubbing towers or the like. Any other scrubbing procedure or apparatus by means of which the gas is brought into intimate contact with the liquid may be used for this purpose. The use of suitable corrosion-resistant materials, where necessary, is, of course, taken for granted.

The temperature of the water with which the methyl chloride is scrubbed should not exceed 40° C. The crude methyl chloride as it is first obtained from the catalytic reaction of hydrochloric acid and methanol has a temperature of about 150° C. Although it is not essential, it is preferred that this crude methyl chloride be first cooled to between 50° C. and 60° C. before it is passed through the water scrubber. By first cooling the same, a considerable proportion of hydrochloric acid will be condensed from the gaseous product. Under these circumstances the methyl chloride will be passed into the water scrubber at a temperature of about 50° C. The water entering the scrubber must have such a volume and temperature that it will not be heated to exceed 40° C., i. e., the water leaving the scrubber should have a temperature of 40° C. or less. Good operation is obtained if the water entering the scrubber has a temperature of between 10° C. and 20° C. if the methyl chloride entering the scrubber has a temperature in the neighborhood of 50° C. If the methyl chloride entering the scrubber has a higher temperature the water entering the scrubber must be adjusted in volume and temperature so that the water leaving the scrubber will not be hotter than 40° C.

If the temperature of the methyl chloride is allowed to exceed 40° C., the methanol and hydrochloric acid contained in it will not be absorbed to a sufficient extent by the scrubbing liquid. Insufficient removal of methanol and hydrochloric acid has been found to result in two very deleterious effects. High concentrations of hydrochloric acid in the gases entering the subsequent alkaline scrubber cause the temperature of the alkaline scrubbing liquid to rise unduly, thus requiring external cooling and resulting in excessive consumption of alkali. Incomplete absorption of the methanol in the water scrubber results in excessive formation of dimethyl ether in the subsequent scrubbing with sulfuric acid.

The temperature of the water scrubber can be maintained at the desired level by properly regulating the rate of flow of the water through the scrubbing apparatus, or by first cooling the water. The process will function well if the water temperature, at the point where it leaves the scrubber, is maintained below 40° C., for example, between 10° C. and 40° C. Preferably, however, to avoid undesirable solubility losses of methyl chloride in the scrubbing liquid, the temperature of the water leaving the scrubber is maintained between 30° C. and 40° C.

As above stated, the sodium hydroxide solution employed in the alkali scrubber should have a concentration not to exceed 10% by weight. If desired, two or more alkali scrubbers can be used in series with successively stronger concentrations. The strongest solution employed should not, however, exceed 10% by weight of sodium hydroxide. Preferably, the sodium hydroxide solution should contain at least 3% by weight of sodium hydroxide. Furthermore, none of the alkali scrubbers should be operated at a temperature exceeding 25° C. To operate these scrubbers at a higher temperature has been found to cause a hydrolysis of the methyl chloride.

The sulfuric acid scrubbers should be operated with concentrated sulfuric acid. Preferably, the strength of the sulfuric acid is at least 60° Bé. (78% $H_2SO_4$ by weight). If desired, a plurality of sulfuric acid scrubbing towers with successively stronger acid can be employed.

The present invention will be more easily understood by reference to the following detailed description when taken in connection with the accompanying illustration, in which the figure is a diagrammatic side elevational view of one embodiment of apparatus suitable for use in carrying out the process of the invention.

In the drawing, reference numerals 1, 2, 3 and 4 designate respectively, a water scrubber, two sodium hydroxide scrubbers, and a sulfuric acid scrubber. Each scrubbing unit is provided with a liquid circulating mechanism comprising a conduit 5, a pump 6, inlet conduit 8 and valve 9 for fresh incoming solution, and outlet conduit 10 and valve 11 for discard, or recovery, of used liquid. Water scrubber 1, as shown, is also provided with a water cooling jacket 7 to be used, if and when necessary, to maintain the temperature of the water at the desired level. If desired, a similar cooling unit may be provided on the conduit 5 of the other scrubbing units.

The crude methyl chloride gas is passed in to scrubber 1, which may be provided with proper packing material to ensure intimate contact between gas and liquid, through conduit 13, regulated by valve 12. The methyl chloride is passed from water scrubber 1 to sodium hydroxide scrubber 2, through conduit 14; from sodium hydroxide scrubber 2 to sodium hydroxide scrubber 3 through conduit 15; from sodium hydroxide scrubber 3 to sulfuric acid scrubber 4 through conduit 16; and it is passed from scrubber 4 through conduit 17 regulated by valve 18.

By the above-described process in which the temperature of the water and alkali scrubbers is carefully regulated and controlled, and the concentration of the alkali scrubbing liquid is maintained below 10%, it is possible to readily and consistently produce methyl chloride containing less than 0.0005% methanol and less than 0.002% dimethyl ether. By the above-said process unreacted methanol and dimethyl ether is not only almost completely removed from the methyl chloride but hydrolysis of methyl chloride in the alkaline scrubbers and formation of dimethyl ether in the sulfuric acid scrubbers is very substantially eliminated.

The following example is given to illustrate the present invention, it being understood that the specific details set forth in this example are not to be considered as limiting the invention.

*Example*

Crude methyl chloride produced by the reaction of methanol with hydrochloric acid in the presence of zinc chloride, and containing 0.5% unreacted methanol and 20% unreacted hydrochloric acid is passed through a series of scrubbers such as illustrated in the accompanying drawing. Water (tap or distilled), having a temperature of 10° C., is pumped by means of pump 6 through valve 9 and conduits 8 and 5 into the top of scrubber 1. The No. 1 scrubber tower which has a packed capacity of 40 cubic feet, is filled with 1-inch Raschigs rings as a packing material. The water is pumped through the scrubber at a rate of 35 gallons per minute. After passing from the bottom of scrubber 1, one-half the water is recirculated and one-half is discarded by adjustment of valve 11. Additional water is supplied through valve 9 to compensate for the discharged water. The water temperature is maintained at a temperature of 10° C. at the inlet to the scrubber either by circulating a refrigerating medium through cooling jacket 7 or by discarding a larger proportion of water.

Freshly produced crude methyl chloride having a temperature of 50° C. is passed into the bottom of scrubber 1 at a rate of 100 cubic feet per minute. The scrubber is operated in such a manner as to maintain a scrubbing liquid discharge temperature between 30 and 40° C. The methyl chloride passing from the top of scrubber 1 is passed successively through scrubbers 2, 3 and 4.

Scrubber 2 has a packed capacity of 60 cubic feet and is filled with 1-inch Raschig rings as a packing material. An aqueous solution of sodium hydroxide containing 8% by weight of sodium hydroxide is circulated through scrubber 2 at the rate of 20 gallons per minute. Sodium hydroxide solution is withdrawn through valve 11 in scrubber 2 at the rate of 2 gallons per minute, and fresh sodium hydroxide is added to the system through valve 9 of this scrubber at the same rate.

Scrubber 3 has a packed capacity of 60 cubic feet and is filled with 1-inch Raschig rings as a packing material. An aqueous solution of sodium hydroxide containing 10% by weight of sodium hydroxide is circulated through scrubber 3 at the rate of 20 gallons per minute. Sodium hydroxide solution is withdrawn through valve 11 in scrubber 3 at the rate of 2 gallons per minute, and fresh sodium hydroxide is added at the same rate.

Scrubber 4 has a packed capacity of 60 cubic feet and is filled with 1-inch Raschig rings as a packing material. Sulfuric acid of 62° Bé. is circulated through scrubber 4 at the rate of 20 gallons per minute. Sulfuric acid is withdrawn at the rate of 2 gallons per minute, and fresh sulfuric acid is added at the same rate.

The methyl chloride passing from the top of scrubber 4 contains 0.0002% methanol and 0.001% dimethyl ether.

Throughout the specification and claim, proportions and percentages are proportions and percentages by weight unless otherwise specified.

Since it is obvious that many changes and modifications can be made in the above-described details without departing from the spirit and scope of the invention, it is to be understood that

We claim:

A process for the purification and drying of methyl chloride containing methanol, hydrochloric acid and water which comprises scrubbing said methyl chloride with water having a temperature below 40° C. throughout said scrubbing procedure, subsequently scrubbing the methyl chloride with a plurality of aqueous solutions of sodium hydroxide having succeedingly greater strengths, said solutions having a strength between 3% and 10% and a temperature maintained at all times below 25° C., and thereafter scrubbing the methyl chloride with sulfuric acid of at least 60° Bé.

EDGAR ALLEN THRONSON.
ARTHUR IGNATIUS MENDOLIA.

REFERENCES CITED

The following references are of record in the file of this patent:

UNITED STATES PATENTS

| Number | Name | Date |
|---|---|---|
| 2,091,986 | Holt et al. | Sept. 7, 1937 |